(12) United States Patent
Morita et al.

(10) Patent No.: US 12,326,414 B2
(45) Date of Patent: Jun. 10, 2025

(54) GAS SENSOR

(71) Applicant: DENSO CORPORATION, Kariya (JP)

(72) Inventors: Kouji Morita, Kariya (JP); Masato Ozawa, Kariya (JP); Tomofumi Fujii, Kariya (JP)

(73) Assignee: DENSO CORPORATION, Kariya (JP)

( * ) Notice: Subject to any disclaimer, the term of this patent is extended or adjusted under 35 U.S.C. 154(b) by 350 days.

(21) Appl. No.: 18/153,880

(22) Filed: Jan. 12, 2023

(65) Prior Publication Data

US 2023/0152270 A1 May 18, 2023

Related U.S. Application Data

(63) Continuation of application No. PCT/JP2021/023700, filed on Jun. 23, 2021.

(30) Foreign Application Priority Data

Jul. 14, 2020 (JP) .................... 2020-120571

(51) Int. Cl.
*G01M 15/00* (2006.01)
*G01M 15/10* (2006.01)
*G01N 27/407* (2006.01)

(52) U.S. Cl.
CPC ...... *G01N 27/4078* (2013.01); *G01M 15/102* (2013.01)

(58) Field of Classification Search
CPC .................... G01M 15/102; G01N 27/4078
See application file for complete search history.

(56) References Cited

U.S. PATENT DOCUMENTS

| 2009/0120536 A1* | 5/2009 | Tomita | C22C 38/22 |
| | | | 148/326 |
| 2009/0214389 A1* | 8/2009 | Miyata | G01N 27/407 |
| | | | 422/83 |
| 2011/0017596 A1* | 1/2011 | Kamiya | G01N 27/407 |
| | | | 419/38 |
| 2012/0312685 A1* | 12/2012 | Kobayashi | G01N 27/4078 |
| | | | 204/431 |
| 2013/0004360 A1* | 1/2013 | Kanno | C21D 6/002 |
| | | | 148/609 |

(Continued)

FOREIGN PATENT DOCUMENTS

| DE | 10 2004 063 171 | 7/2006 |
| JP | 2005-206944 | 8/2005 |

(Continued)

*Primary Examiner* — Jamel E Williams
(74) *Attorney, Agent, or Firm* — Nixon & Vanderhye P.C.

(57) ABSTRACT

A gas sensor is provided with a housing provided with a locking step part formed on an inner peripheral surface thereof; a sensor body provided with a locked flange part locked to the locking step part from a base end side thereof and supported inside the housing; a sealing member filled into a filling part between the inner peripheral surface of the housing and an outer peripheral surface of the sensor body in a base end side of the locked flange part; and an insulation member provided between the inner peripheral surface of the housing and the outer peripheral surface of the sensor body in a base end side of the sealing member. The filling part includes an annular groove protruding in an outer peripheral side.

6 Claims, 5 Drawing Sheets

(56) References Cited

U.S. PATENT DOCUMENTS

| | | | |
|---|---|---|---|
| 2013/0306204 A1* | 11/2013 | Teraoka | C22C 38/46 |
| | | | 420/60 |
| 2017/0198624 A1* | 7/2017 | Borisch | B32B 15/04 |
| 2017/0261466 A1* | 9/2017 | Saito | G01N 27/4067 |
| 2020/0150079 A1* | 5/2020 | Morita | G01N 27/4078 |

FOREIGN PATENT DOCUMENTS

| | | | |
|---|---|---|---|
| JP | 2010-19729 | | 1/2010 |
| JP | 2011052762 A | * | 3/2011 |
| JP | 2015-64273 | | 4/2015 |
| WO | 2022/014282 | | 1/2022 |

* cited by examiner

GAS SENSOR

CROSS-REFERENCE OF RELATED APPLICATION

This application is a continuation application of International Application No. PCT/JP2021/23700 filed on Jun. 23, 2021, which designated the U.S. and claims priority to Japanese Patent Application No. 2020-120571 filed on Jul. 14, 2020, the contents of both of these are incorporated herein by reference.

BACKGROUND

Technical Field

The present disclosure relates to a gas sensor.

Description of the Related Art

Various gas sensors have been developed which are disposed in the exhaust system or the like in an internal combustion engine to detect specific gas components in a gas such as exhaust gas to be measured. According to a gas sensor that supports the sensor body inside the housing, a gap between the housing and sensor body may be required to be sealed airtightly.

SUMMARY

The present disclosure provides a gas sensor capable of improving the airtightness of a portion between the housing and the sensor body.

One aspect of the present disclosure is a gas sensor including a housing provided with a locking step part formed on an inner peripheral surface thereof; a sensor body provided with a locked flange part locked to the locking step part from a base end side thereof and supported inside the housing; a sealing member filled into a filling part between the inner peripheral surface of the housing and an outer peripheral surface of the sensor body in a base end side of the locked flange part; and an insulation member provided between the inner peripheral surface of the housing and the outer peripheral surface of the sensor body in a base end side of the sealing member.

BRIEF DESCRIPTION OF THE DRAWINGS

The above-described objects and other objects, features and advantages of the present disclosure will be clarified further by the following detailed description with reference to the accompanying drawings.

The drawings are.

DESCRIPTION OF THE PREFERRED EMBODIMENTS

Various gas sensors have been developed which are disposed in the exhaust system or the like in an internal combustion engine to detect specific gas components in a gas such as exhaust gas to be measured. According to a gas sensor that supports the sensor body inside the housing, a gap between the housing and sensor body may be required to be sealed airtightly. According to this type of gas sensor, a sealing member is filled into the gap so as to accomplish an airtight sealing. For example, a gas sensor disclosed in patent literature JP-A-2019-20232, the material composition of the housing is optimized to accomplish airtightness in a high temperature environment.

In recent years, high performance gas sensors are required. For this reason, high-level air tightness may be required for the gap between the housing and the sensor body.

With reference to the drawings, embodiments of the present disclosure will be described.

First Embodiment

Figure 1:
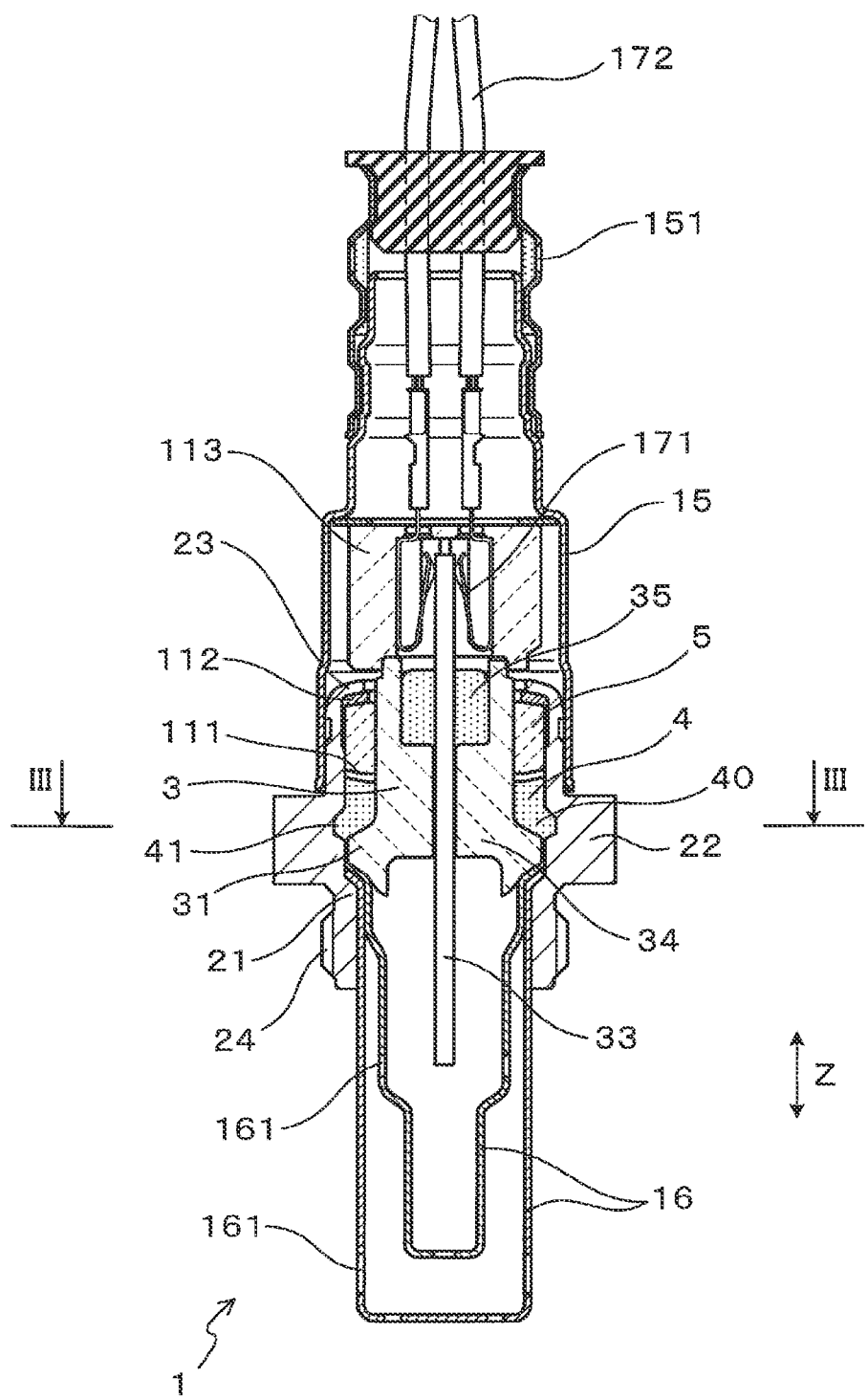
FIG. 1 is a cross sectional view a gas sensor sectioned along the axial direction thereof according to a first embodiment.

With reference to FIGS. 1 to 4, an embodiment of a gas sensor will be described. As shown in FIG. 1, a gas sensor 1 includes a housing 2, a sensor body 3, a sealing member 4 and an insulation member 5

The housing 2 is provided with a locking step part 21 formed on an inner peripheral surface thereof. The sensor body 3 is provided with a locked flange part 31 locked to the locking step part 21 from the base end side. The locked flange part 31 is supported inside the housing 2. The sealing member 4 is filled into the filling part 40 between the inner peripheral surface of the housing 2 and the sensor body 3 in the base end side of the locked flange part 31. The insulation member 5 is provided between a portion between the inner peripheral surface of the housing 2 and the sensor body 3 in the base end side of the sealing member 4. The filling part 40 includes an annular groove 41 protruding in the outer peripheral side.

Figure 3:
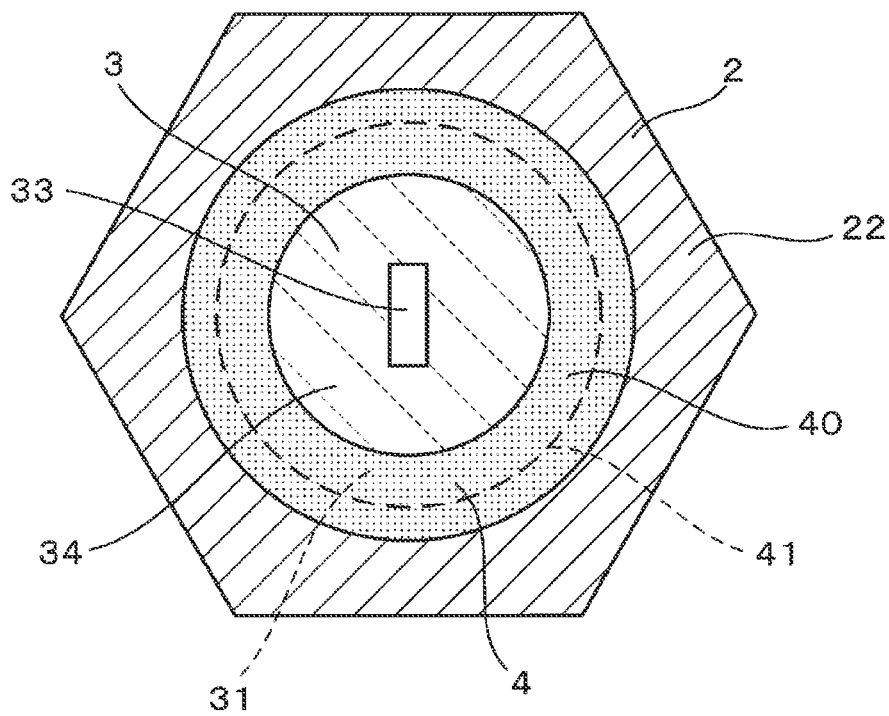
FIG. 3 is a cross sectional view sectioned along a line III-III shown in FIG. 1.

According to the present embodiment, as shown in FIGS. 1 and 3, the sensor body 3 includes a sensor element 33 provided with a sensing unit and an insulator 34 that supports the sensor element 33. The sensor element 33 is configured as a laminated sensor element in which a plurality of ceramic layers including a solid electrolyte. The insulator 34 supports the sensor element 33 being inserted therethrough in the axial direction. A glass sealing member 35 is filled into a concave portion provided in a base end of the insulator 34. The glass sealing member 35 seals a portion between the insulator 34 and the sensor element 33. The insulator 34 is made of ceramic such as alumina, for example.

Figure 2:
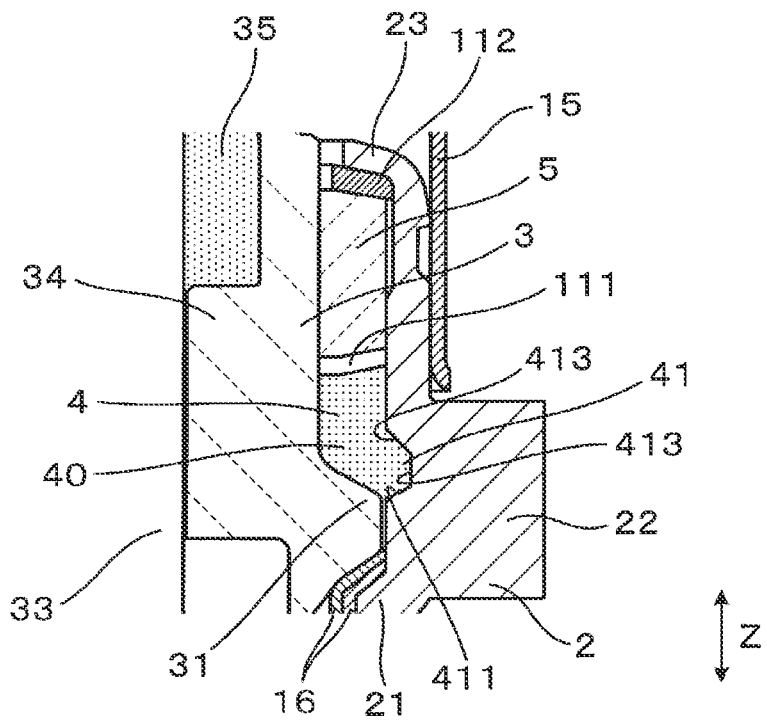
FIG. 2 is a cross sectional view showing a portion in the vicinity of a filling part.

As shown in FIGS. 1 and 2, the locked flange part 31 is formed in an outer peripheral portion of the insulator 34. That is, according to the present embodiment, the locked flange part 31 provided in the insulator 34 is locked at the locking step part 21.

As shown in FIG. 1, a tip end side cover 16 is provided at a tip end side of the housing 2 so as to cover the sensor body 3. The gas sensor 1 according to the present embodiment includes double structured tip end side cover 16. These tip end side covers 16 are fixed to the housing 2 at the base end portion thereof. According to the present embodiment, the base end of the tip end side cover 16 is interposed between the locking step part 21 of the housing 2 and the locked flange part 31 of the sensor body 3.

As shown in FIGS. 1 and 2, the sealing member 4, a packing 111, the insulation member 5 and a metal ring 112 are sequentially arranged in a base end side of the locked flange part 31. These members are caulked in an axial direction Z by a caulking member 23, and receive a compressive load in the axial direction Z. The sealing member 4 is made of, for example, ceramic powder such as talc. Note that the axial direction Z is the axial direction of the gas sensor 1.

As shown in FIG. 1, a gas flow hole 161 allowing a measurement gas to flow therethrough is formed at a tip end side cover 16. The measurement gas such as an exhaust gas is lead inside the tip end side cover 16 and reaches a measurement electrode (not shown) of the sensor element 33.

Also, a base end side cover 15 having substantially cylindrical shape is fixed to the base end side of the housing 2. The base end side cover 15 is fixed to an outer peripheral surface of the housing 2 in an outer peripheral side of the caulking member 23 by a welding or the like.

A contact terminal 171 is provided inside the base end side cover 15 for connecting with a terminal disposed in the base end side of the sensor element 33. A lead 172 connected to the contact terminal 171 protrudes towards the base end side of the gas sensor 1. Further, the contact terminal 171 is supported by a terminal supporting member 113 having insulation properties. The terminal supporting member 113 is made of, similar to the insulator 34, ceramic such as alumina.

The base end side cover 15 is provided with an air introduction part 151 that introduces atmospheric air inside the base end side cover 15. The atmospheric air introduced inside the base end side cover 15 from the air introduction part 151 reaches the reference electrode (not shown) provided inside the sensor element 33.

The gas sensor 1 may be configured to be disposed in the exhaust pipe of the internal combustion engine of a vehicle and to detect gas component in the exhaust gas flowing through the exhaust pipe. The gas sensor 1 according to the present embodiment can be used as an A/F sensor (also referred to as air fuel ratio sensor) that detects the air fuel ratio (i.e. A/F) of the internal combustion engine which is acquired in accordance with the composition of the exhaust gas. The sealing member 4 is filled into the filling part 40 in order to prevent the measurement gas such as the exhaust gas introduced inside the tip end side cover 16 from leaking inside the base end side cover 15 from a portion between the sensor body 3 and the housing 2. Note that the gas sensor 1 can be configured as an oxygen sensor that outputs ON-OFF signal as a result of determination whether the A/F acquired in accordance with the composition of the exhaust gas is in a fuel rich side or a fuel lean side relative to the theoretical air fuel ratio.

The gas sensor 1 is mounted to a mount portion of the exhaust pipe or the like at a mount screw part 24 disposed in the housing 2. In other words, the mount screw 24 of the housing 2 is caused to be engaged to a female screw part provided on the mount portion, whereby the gas sensor 1 is mounted to the mount portion. The housing 2 includes the following polygonal member 22 at the base end side of the mount screw part 24. In the case where the mount screw part 24 is attached to the mount portion, a tool is engaged with the polygonal member 22.

As shown in FIGS. 2 and 3, the polygonal member 22 protrudes in the outer peripheral side than both side portions of the housing 2 relative to the axial direction Z are. The polygonal member is configured to have polygonal shape when viewed from the axial direction Z. The annular groove 41 is provided in a region in which the polygonal member 22 in the Z direction is formed. According to the present embodiment, the shape of the polygonal member 22 is a regular hexagonal shape when viewed from the axial direction.

Figure 4:
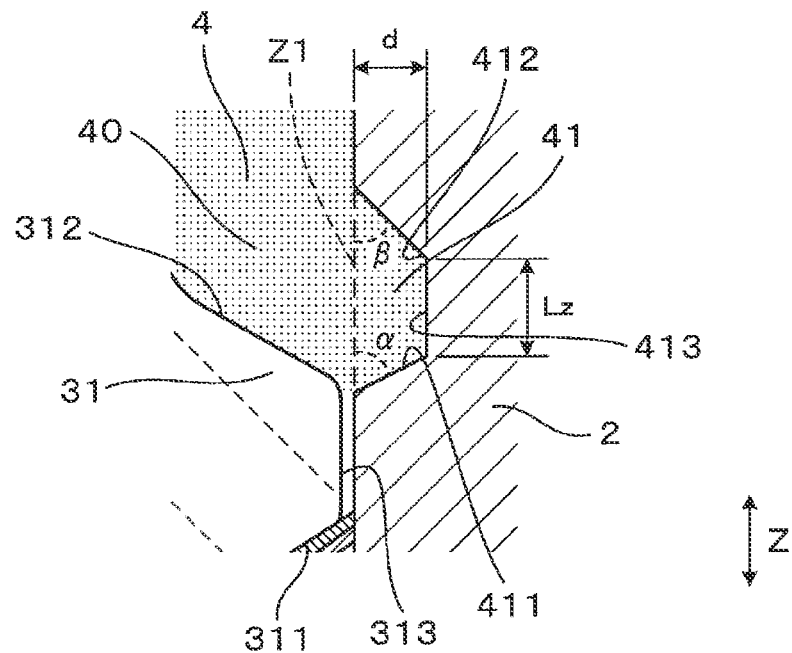
FIG. 4 is a cross sectional view of an annular groove according to the first embodiment.

The locking step part 21, the locked flange part 31, the filling part 40, the annular groove 41 are each formed in a circular shape of which the center is the center axis of the gas sensor 1. For the annular groove 41, a tip end side wall surface 411 is inclined towards a base end side as it approaches the outer peripheral side. That is, the angle $\alpha$ shown in in FIG. 4 is less than 90°. More preferably, the angle $\alpha$ is less than or equal to 85°. Note that the dotted line Z1 in FIG. 4 is a linear line parallel to the axial direction Z. The angle $\alpha$ may be set to be larger than or equal to 60°.

Also, for the annular groove 41, a base end side wall surface 412 is inclined towards a tip end side as it goes to the outer peripheral surface. The angle $\beta$ formed between the base end side wall surface 412 is less than or equal to 45°. The angle $\beta$ may be set to be larger than or equal to 15°, for example.

The annular groove 41 has a depth d ranging from 0.2 mm to 0.5 mm. The annular groove 41 has a grooved bottom surface 413 along the axial direction Z in the outer peripheral side. The length Lz of the grooved bottom surface 413 in the axial direction Z can be set to be longer than the depth d of the annular groove 41. The length Lz is set to be larger than or equal to 0.7 mm.

For the locked flange part 31, a tip end side surface 311 is inclined towards a base end side as it goes to the outer peripheral surface. For the locked flange part 31, a base end side wall surface 312 is inclined towards a tip end side as it approaches the outer peripheral surface. Further, a flange top face 313 is provided along the axial direction Z at a protrusion end of the locked flange part 31. A positional difference between the outer peripheral end of the base end side surface 312 of the locked flange part 31, and the inner peripheral end of the tip end side wall surface 411 in the annular groove 41 in the axial direction Z is less than or equal to 0.3 mm. According to the present embodiment, a position of the outer peripheral end of the base end side surface 312 and a position of the inner peripheral end of the tip end side wall surface 411 are substantially the same in the axial direction.

Next, an example of a method for assembling the sensor body 3 to the housing 2 in the manufacturing process of the gas sensor 1 according to the present embodiment will be described. In a state before assembling the sensor body 3 to the housing 2, the caulking member 23 of the housing 2 stands along the axial direction Z. The sensor body 3 is inserted inside the housing 2 from the base end side in the axial direction Z during the state before assembling the sensor body 3 to the housing 2. The sensor body 3 is prepared in advance as a sub-assembly having the sensor element 33, the insulator 34 and the glass sealing member 35. According to the present embodiment, the tip end side cover 16 is attached in advance to the housing.

The sensor body 3 provided being inserted in the housing 2 causes the locked flange part 31 to be locked at the locking step part 21 via the base end portion of the tip end side cover 16. Next, the sealing member 4, the packing 111, the insulation member 5 and the metal ring 112 are sequentially arranged in this order in an annular space between the outer peripheral surface of the sensor body 3 and the inner peripheral surface of the housing 2 from the base end side. The sealing member 4 is made of ceramic powder such as talc. The sealing member 4 is filled into the filling part 40 including the annular groove 41. At this moment, the sealing member 4 is pressed in the axial direction Z such that the sealing member 4 is filled in the entire filling part 40 uniformly as much as possible.

Then, the base end portion of the housing 2 is processed to be inwardly bent, thereby forming the caulking member 23 as shown in FIG. 2. With this caulking portion 23, the sealing member 4, the packing 111, the insulation member 5 and the metal ring 112 are caulked to be fixed in the axial direction Z. The fixing by caulking can be made with thermal calking such that the base end portion of the housing 2 which will be the caulking portion 23 is heated at high temperature, thereby readily making it deformed.

Next, effects and advantage according to the present embodiment will be described. In the gas sensor 1, the filling part 40 includes the annular groove 41. Thus, the length of a boundary surface between the sealing member 4 and the housing 2 can be longer. As a result, the airtightness between the housing 2 and the sensor body 4 can be improved.

Further, the annular groove 41 is provided. Hence, an area to which a surface pressure of the sealing member 4 is applied from the axial tip end side can be larger in the filling part 40. Hence, the pressure applied to the sealing member 4 can be larger without causing the load applied to the locked flange part 31 to be excessively large. As a result, the airtightness between the housing 2 and the sensor body 3 can be improved.

The annular groove 41 is provided in the filling part 40, whereby an amount of the sealing member 4 can be increased. Thus, a decrease in the internal pressure of the sealing member 4 due to a difference of thermal expansion between the housing 2 and the sensor body 3 is likely to be avoided. In this respect, airtightness between the housing 2 and the sensor body can be enhanced.

For the A/F sensor, one having an atmospheric air duct which introduces atmospheric air inside the sensor element 33 is known. According to this A/F sensor, in the case where the A/F (i.e. air fuel ratio) is on the fuel rich side, unburned gas is chemically reacted at an electrode which is exposed to the exhaust gas, causing oxide ions ($O^{2-}$) to move to the electrode exposed to the exhaust gas from the electrode exposed to the atmospheric air via a solid electrolyte. Thus, the air fuel ratio A/F on the fuel rich side is detected.

According to the A/F sensor having the atmospheric duct, in the case where the A/F is on the fuel rich side, if an exhaust gas is mixed into the atmospheric air introduced inside the sensor element, because of a decrease in the oxygen concentration of the atmospheric air, the oxide ions ($O^{2-}$) may not be transferred to the electrode exposed to the exhaust gas from the electrode exposed to the atmospheric air via the solid electrolyte. In this case, coverage of a detection range capable of detecting the A/F in the fuel rich side may be smaller.

In the A/F sensor, in the above-described aspect, the sealing properties between a space inside the base end side cover 15 and a space inside the tip end side cover 26 by using the sealing member 4 is important. Then, according to the present embodiment, as described above, since the sealing properties using the sealing member 4 can be improved, the detection range in the fuel rich side can readily be ensured in the A/F sensor.

Also, the oxygen sensor detects lean and rich states of the fuel with an output of the electromotive force produced by a difference between the oxygen concentration in the atmospheric air inside the base end side cover 15 and the oxygen concentration in the exhaust gas inside the tip end side cover 16. Hence, in the case where the gas sensor 1 is configured as an oxygen sensor, if the exhaust gas is mixed into the atmospheric side, the detection accuracy may be affected. Accordingly, even when the gas sensor 1 of the present embodiment capable of improving the sealing properties of the sealing member 4 is applied to the oxygen sensor, an advantage in which the detection accuracy is improved can be obtained.

Further, the contact terminal 17 is provided in the base side cover 15. Hence, when the exhaust gas enters inside the base end side cover 15, the exhaust gas may reach the contact terminal 171. In this case, the contact terminal 171 may surfer from a corrosion due to moisture, nitrogen compound and the like in the exhaust gas. Therefore, the gas sensor 1 of the present embodiment capable of improving the sealing properties of the sealing member 4 is superior from a view point of protecting the contact terminal 171 from a corrosion. Moreover, according to the present embodiment, since the exhaust gas can be suppressed from leaking towards the base end side under a high temperature environment, an anti-corrosion reliability can be ensured for the contact terminal 171 under the high temperature environment.

Further, the annular groove 41 is provided in a region where the polygonal member 22 is formed in the axial direction Z. Thus, the annular groove 41 can be provided while ensuring sufficient strength of the housing 2.

For the annular groove 41, the tip end side wall surface 411 is inclined towards the base end side as it goes to the outer peripheral surface. Thus, the sealing member 4 is readily filled into the annular grove 41. Hence, without applying excessive filling weight when filling the sealing member 4, the sealing member 4 can be filled into the filing part 40 including the annular groove 41. As a result, the sealing member 4 can be filled into the filling part 40 without applying excessive load to the locked flange part 31.

For the annular groove 41, a base end side wall surface 412 is inclined towards a tip end side as it goes to the outer peripheral surface, and an angle β formed relative to the axial direction Z is 45° or lower. With this configuration, the sealing member 4 can be smoothly filled into the annular groove 4. As a result, the sealing member 4 can be filled into the filling part 40 without applying excessive load to the locked flange part 31.

The annular groove 41 has a depth ranging from 0.2 mm to 0.5 mm. Thus, the sealing properties can be enhanced while ensuring easy filling of the sealing member 4 into the annular groove 41.

Also, the annular groove 41 has the grooved bottom surface 413. Thus, the sealing member 4 can more easily filled into the whole annular groove 41.

As described, according to the present embodiment, gas sensor capable of improving the airtightness between the housing and the sensor body.

Comparative Example

Figure 5:
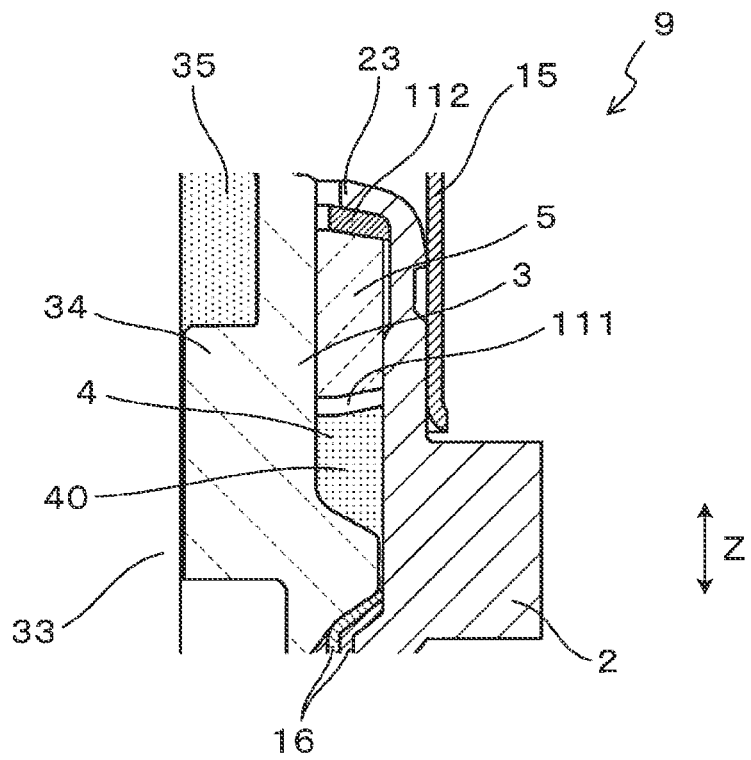
FIG. 5 is a cross sectional view showing a portion in the vicinity of the filling part.

As shown in FIG. 5, according to the comparative example, the gas sensor 9 is configured not to include the annular grove in the filling part 40 (reference 41 shown in FIG. 2). According to the configuration of the comparative example, the annular groove is not provided in the filling part 40, other configurations are similar to those in the first embodiment. In the reference symbols used after the comparative example, symbols same as those in the existing embodiments indicate similar constituents in the existing embodiments unless otherwise specified.

According to the present example, it is difficult to set the length of the boundary surface between the sealing member 4 and the housing 2 to be longer. Also, in the filling part 40, a surface that receives a surface pressure of the sealing member 4 from the tip end side in the axial direction is substantially only the base end side surface of the locked flange part 31 of the sensor body 3. Hence, a compressive load applied to the sealing member 4 is unlikely to be larger and the airtightness between the housing 2 and the sensor body 3 is difficult to improve.

Experiment Example

Figure 6:
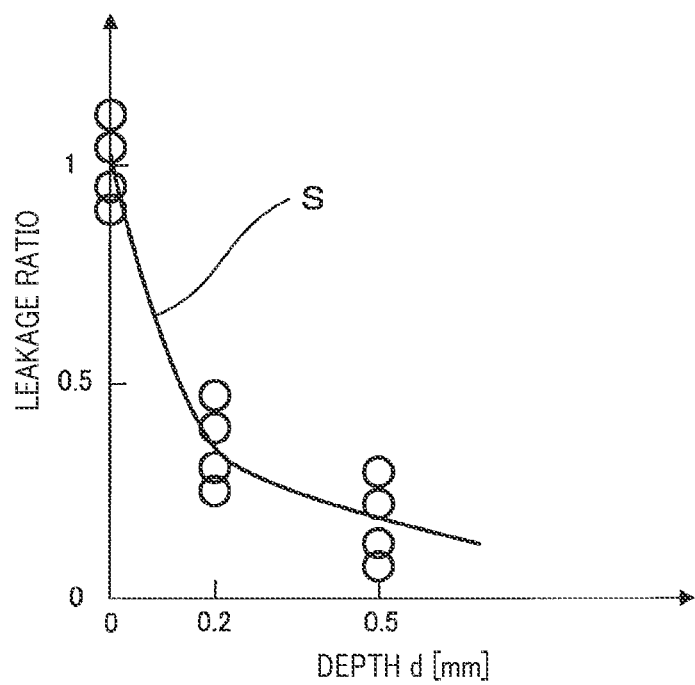
FIG. 6 is a graph showing a measurement result of an experiment example.

According to the present example, as shown in FIG. 6, a relationship between a depth d of the annular groove 41, and the airtightness between the housing 2 and the sensor body 3 is researched. The samples 1, 2 and 3 are prepared having the depth d of the annular groove 41 of 0.5 mm, 0.2 mm and 0 mm respectively. The samples 1 and 2 have the same configurations as that of the gas sensor 1 described in the first embodiment. The sample 3 has the same configuration as that of the gas sensor 9 described in the comparative example. Four samples are prepared for respective samples 1, 2 and 3.

For an evaluation test of airtightness, a heat and cool process applied to the housing 2 was performed for 3000 cycles. In each cycle, the polygonal member 22 of the housing 2 is heated at 650° C. and then cooled at lower than or equal to 50° C. with an air cooling. An amount of leakage between the housing 2 and the sensor body 3 is measured in a state where the exhaust gas is supplied such that a pressure at a space closer to the tip end side than the position of the sealing member 4 is set to be 0.4 MPa after forming a state where the polygonal member 22 of the housing 22 is maintained at 650° C. Note that a space closer to the base end side than the position of the sealing member 4 is held at the atmospheric pressure.

FIG. 6 shows the measurement result. In FIG. 6, the vertical axis indicates a leakage ratio of the exhaust gas. Here, the leakage ratio refers to a ratio of a leakage amount per unit time of the exhaust gas for respective samples in the sample 3 having no annular groove 41, where the leakage amount per unit time is defined as 1. Further, in FIG. 6, circular plots indicate the leakage ratio of respective samples and the curve S indicates an approximate curve that substantially connects average values of respective samples.

Referring to FIG. 6, the leakage ratio is significantly reduced for the sample 1 (d=0.5 mm) and sample 2 (d=0.5 mm) each having the annular grooves 41, compared to the sample 3 (d=0 mm) having no annular grove 41. With reference to FIG. 6, it was realized that the deeper the depth d, the more the leakage ratio is reduced. With this result, it was confirmed that the airtightness between the housing 2 and the sensor body 3 is improved by the annular groove 41. For the depth d of the annular groove 41, when setting it to be 0.2 mm or larger, sufficient airtightness is secured. In order to secure the processability and the strength of the housing 2, the depth d of the annular groove 41 may be set to be from 0.2 mm to 0.5 mm, for example.

Second Embodiment

Figure 7:
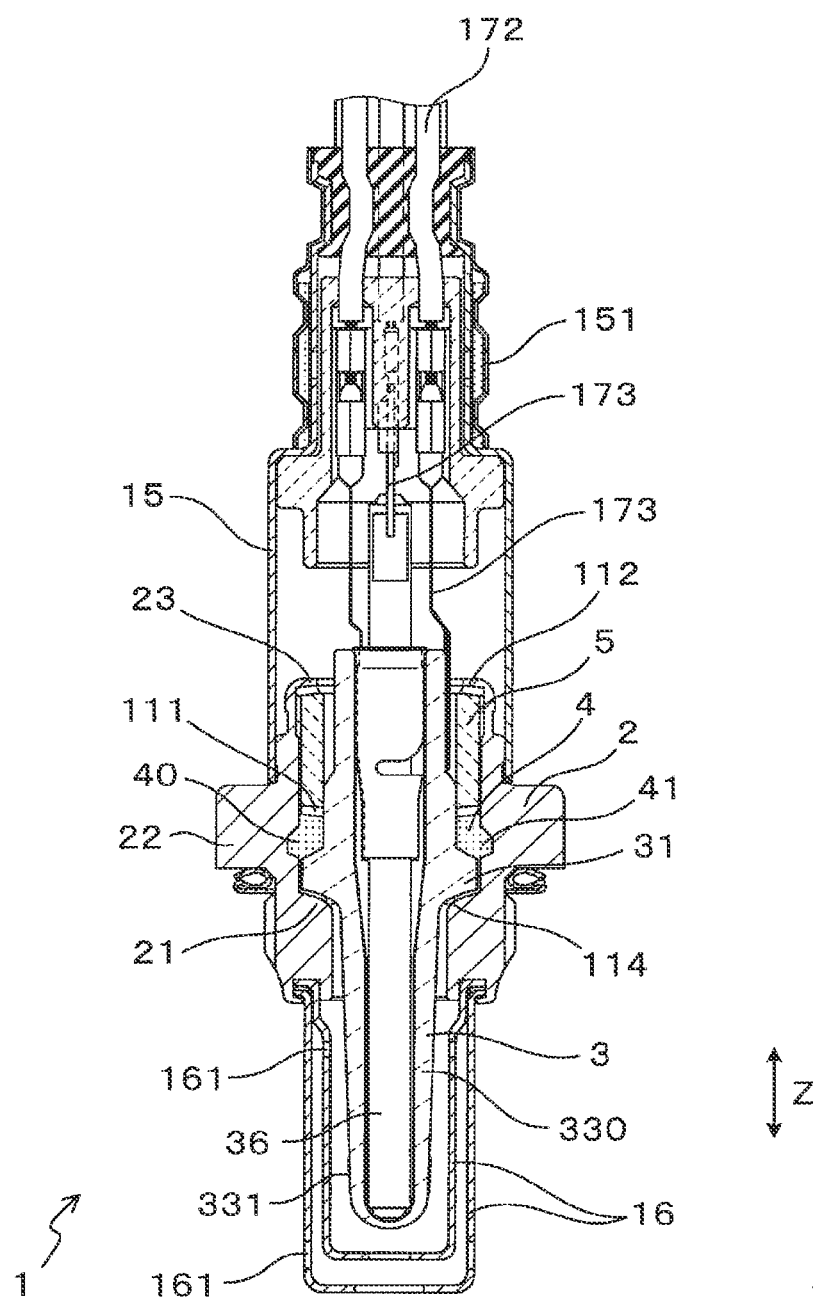
FIG. 7 is a cross sectional view of a gas sensor sectioned along the axial direction thereof according to a second embodiment.

As shown in FIG. 7, the second embodiment is an embodiment of the gas sensor 1 in which the sensor body 3 is configured of a sensor element 330 having a bottomed cylindrical shape. That is, according to the present embodiment, the sensor body 3 is configured as a cup shaped sensor element 330 in which the tip end side is closed and the base end side is opened. The sensor body 3 according to the present embodiment does not have a member corresponding to the insulator 34 of the first embodiment.

The locked flange part 31 is formed such that a diameter of the outer peripheral surface of the sensor element 330 is partially enlarged. The locked flange part 31 is locked to the locking step part 21 via the packing 114 having an annular shape. According to the present embodiment, the tip end side cover 16 is fixed to the tip end part of the housing 2. However, also in the present embodiment, a configuration may be employed in which the tip end side cover 16 is interposed between the locking step part 21 and locked flange part 31.

The filling part 40 having a cylindrical shape is formed in the base end side of the locked flange part 31 between the housing 2 and the sensor body 3. The filling part 40 has an annular groove 41. The sealing member 4 is filled into the filling part 40 including the annular groove 41. The packing 111, the insulation member 5 and the metal ring 112 are disposed in the base end side of the sealing member 4. The sealing member 4, the packing 111, the insulation member 5 and the metal ring 112 are caulked by the caulking member 23 of the housing 2 and pressed in the axial direction.

A heater 36 is provided in the sensor element 330 for heating the sensor element 330. A metal terminal 173 to be connected to the lead 172 is provided for the sensor element 330 and the heater 36.

In the outer peripheral surface of the sensor element 330, a measurement electrode 331 is provided. In the inner peripheral surface of the sensor element 330, a reference electrode is provided (not shown). The measurement electrode 331 is exposed to the inner space of the tip end side cover 16 and exposed to a measurement gas to be measured such as an exhaust gas. On the other hand, an inner space of the sensor element 330 where the reference electrode is disposed, is communicated with a space inside the base end side cover 15, thereby introducing the atmospheric air thereto. Then, the sealing member 4 seals a portion between the sensor element 330 and the housing 2 airtightly to prevent the measurement gas such as exhaust gas from leaking atmospheric air side. Other configurations are the same as those in the first embodiment.

Also, with the present embodiment, a gas sensor 1 capable of improving the airtightness between the housing 2 and the sensor body 3 can be provided. Other than this, effects and advantages similar to those in the first embodiment can be obtained.

The present disclosure is not limited to the above-described embodiments, but may be applied to various embodiment without departing from the spirit of the disclosure.

While the present disclosure has been described in accordance with the examples, the present disclosure should be understood such that the present disclosure is not limited to the examples and structures. The present disclosure also includes various modifications and modifications within an equivalent range. Additionally, various combinations and forms, as well as other combinations and forms further including only one element, more, or less, also fall within the category and scope of the present disclosure.

CONCLUSION

As described, the present disclosure provides a gas sensor capable of improving the airtightness of a portion between the housing and the sensor body.

One aspect of the present disclosure is a gas sensor including a housing provided with a locking step part formed on an inner peripheral surface thereof; a sensor body provided with a locked flange part locked to the locking step part from a base end side thereof and supported inside the housing; a sealing member filled into a filling part between the inner peripheral surface of the housing and an outer peripheral surface of the sensor body in a base end side of the locked flange part; and an insulation member provided between the inner peripheral surface of the housing and the outer peripheral surface of the sensor body in a base end side of the sealing member.

The filling part includes an annular groove protruding in an outer peripheral side.

In the above-described gas sensor, the filling part includes the annular groove. Thus, the airtightness between the housing and the sensor body can be improved.

As described above, according to the above-described aspects, a gas sensor capable of improving the airtightness between the housing and the sensor body can be provided.

What is claimed is:

1. A gas sensor comprising:
   a housing provided with a locking step part formed on an inner peripheral surface thereof;
   a sensor body provided with a locked flange part locked to the locking step part from a base end side thereof and supported inside the housing;
   a sealing member filled into a filling part between the inner peripheral surface of the housing and an outer peripheral surface of the sensor body in a base end side of the locked flange part; and
   an insulation member provided between the inner peripheral surface of the housing and the outer peripheral surface of the sensor body in a base end side of the sealing member,
   wherein
   the filling part includes an annular groove protruding in an outer peripheral side.

2. The gas sensor according to claim 1, wherein
   the housing includes a polygonal member protruding in an outer peripheral side than both side portions thereof relative to an axial direction, and having a polygonal shape when viewed from the axial direction; and
   the annular groove is formed in a region where the polygonal member is formed in the axial direction.

3. The gas sensor according to claim 1, wherein
   the annular groove includes a tip end side wall surface inclined towards a base end side thereof as it approaches the outer peripheral side.

4. The gas sensor according to claim 1, wherein
   the annular groove includes a base end side wall surface inclined towards a tip end side thereof as it goes to the outer peripheral side; and
   an angle formed between the base end side wall surface and the axial direction is smaller than or equal to 45°.

5. The gas sensor according to claim 1, wherein
   the annular groove has a depth ranging from 0.2 mm to 0.5 mm.

6. The gas sensor according to claim 1, wherein
   the annular groove has a grooved bottom surface along the axial direction in the outer peripheral side.

* * * * *